(12) United States Patent
Imada et al.

(10) Patent No.: US 10,850,221 B2
(45) Date of Patent: Dec. 1, 2020

(54) FINE PARTICLE DETECTOR AND EXHAUST GAS PURIFICATION APPARATUS

(71) Applicant: FUJITSU LIMITED, Kawasaki (JP)

(72) Inventors: Tadahiro Imada, Kawasaki (JP); Katsusada Motoyoshi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 582 days.

(21) Appl. No.: 15/642,401

(22) Filed: Jul. 6, 2017

(65) Prior Publication Data
US 2018/0008925 A1    Jan. 11, 2018

(30) Foreign Application Priority Data
Jul. 8, 2016    (JP) .................. 2016-136289

(51) Int. Cl.
  *B01D 46/00*    (2006.01)
  *G01N 22/00*    (2006.01)
  (Continued)

(52) U.S. Cl.
  CPC ....... *B01D 46/0063* (2013.01); *B01D 46/442* (2013.01); *B01D 53/94* (2013.01); *F01N 3/028* (2013.01); *F01N 11/007* (2013.01); *G01N 15/00* (2013.01); *G01N 15/14* (2013.01); *G01N 22/00* (2013.01); *B01D 53/9495* (2013.01);
  (Continued)

(58) Field of Classification Search
  None
  See application file for complete search history.

(56) References Cited

U.S. PATENT DOCUMENTS 5,423,180 A  *  6/1995 Nobue .................... F01N 3/028
                                                              60/274
5,698,870 A  * 12/1997 Nakano ............. H01L 21/28587
                                                              257/194
(Continued)

FOREIGN PATENT DOCUMENTS

EP          1336730 A2 *   8/2003   ......... B01D 46/0024
JP        61-011414          1/1986
(Continued)

OTHER PUBLICATIONS

Translation of JPH07139331, accessed Nov. 20, 2019 (Year: 1995).*
(Continued)

*Primary Examiner* — Christopher P Jones
*Assistant Examiner* — Phillip Y Shao
(74) *Attorney, Agent, or Firm* — Fujitsu Patent Center

(57) ABSTRACT

A fine particle detector includes: a casing part configured to accommodate an object to be heated; an electromagnetic wave generating part configured to generate electromagnetic waves of different frequencies; at least one power sensor configured to measure powers, from the casing part, of the electromagnetic waves that have entered into the casing part; and a fine particle detection controlling part configured to determine, based on the powers of the electromagnetic waves of the different frequencies measured by the at least one power sensor, whether an accumulated amount of fine particles accumulated in the object to be heated is greater than or equal to a predetermined accumulated amount.

15 Claims, 13 Drawing Sheets

(51) Int. Cl.
  *G01N 15/14* (2006.01)
  *B01D 46/44* (2006.01)
  *B01D 53/94* (2006.01)
  *F01N 11/00* (2006.01)
  *F01N 3/028* (2006.01)
  *G01N 15/00* (2006.01)

(52) U.S. Cl.
  CPC ...... *B01D 2279/30* (2013.01); *F01N 2240/05* (2013.01); *F01N 2550/04* (2013.01); *F01N 2560/05* (2013.01); *F01N 2900/0416* (2013.01); *F01N 2900/0602* (2013.01); *F01N 2900/1606* (2013.01); *Y02T 10/40* (2013.01)

(56) References Cited

U.S. PATENT DOCUMENTS

| | | | | |
|---|---|---|---|---|
| 8,161,807 B2* | 4/2012 | Kondo | ............ | F01N 11/00 |
| | | | | 73/114.69 |
| 8,210,033 B2* | 7/2012 | Kondo | ............ | F01N 9/002 |
| | | | | 73/114.69 |
| 2002/0069756 A1* | 6/2002 | Mako | ............ | B01D 46/0063 |
| | | | | 95/148 |

FOREIGN PATENT DOCUMENTS

| | | | |
|---|---|---|---|
| JP | 7-83022 | | 3/1995 |
| JP | H07139331 A | * | 5/1995 |
| JP | 10-220219 | | 8/1998 |
| JP | 2009-057948 | | 3/2009 |
| JP | 2012-507660 | | 3/2012 |
| JP | 2014015909 A | * | 1/2014 |
| WO | 2009/031600 | | 3/2009 |
| WO | 2010/074812 | | 7/2010 |

OTHER PUBLICATIONS

Translation of jp2014015909A, accessed Nov. 20, 2019 (Year: 2014).*

JPOA—Office Action dated Feb. 4, 2020 issued with respect to the basic Japanese Patent Application No. 2016-136289, with full machine translated office action.

* cited by examiner

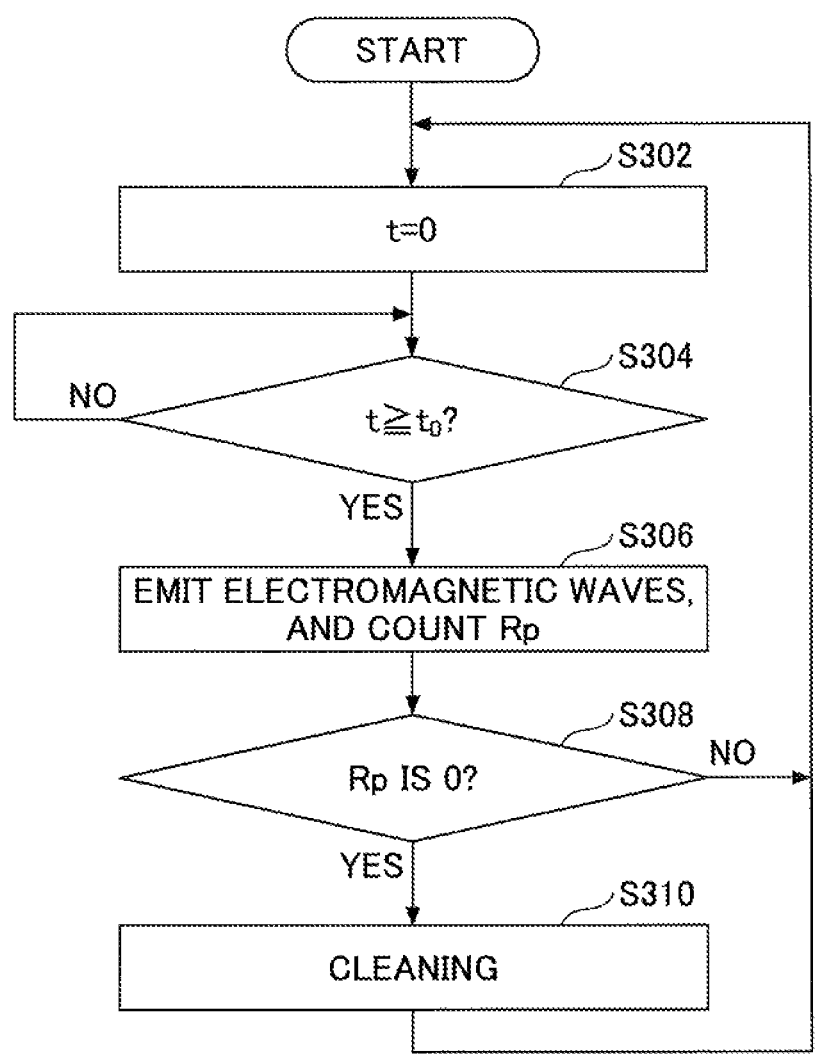

FINE PARTICLE DETECTOR AND EXHAUST GAS PURIFICATION APPARATUS

CROSS-REFERENCE TO RELATED APPLICATIONS

This present application is based upon and claims the benefit of priority of the prior Japanese Patent Application No. 2016-136289, filed on Jul. 8, 2016, the entire contents of which are incorporated herein by reference.

FIELD

The embodiments discussed herein relate to a fine particle detector and an exhaust gas purification apparatus.

BACKGROUND

At present, an exhaust gas purification apparatus using a DPF (Diesel Particulate Filter) has been put to practical use as an apparatus for collecting fine particles such as PM (Particulate matter) contained in exhaust gas. In such an exhaust gas purification apparatus, the fine particles such as PM are accumulated in the DPF by use, and thus it is required to regenerate the DPF. As a method for regenerating the DPF, for example, a method of using a high frequency electromagnetic wave such as a microwave emitted from a microwave heating apparatus is disclosed (for example, Patent Document 1). Specifically, according to the disclosed method, the DPF is regenerated by irradiating the DPF with an electromagnetic wave such as a microwave to heat fine particles such as PM accumulated in the DPF and burn the fine particles.

In the exhaust gas purification apparatus described above, the regeneration of the DPF is carried out, after the fine particulates such as PM have been accumulated in the DPF to some extent, by irradiating the DPF with electromagnetic waves such as microwaves to heat the fine particulates such as PM to cause oxidative decomposition. However, because the DPF is covered by a casing, an amount of fine particles such as PM accumulated in the DPF is unknown from the outside.

Thus, while various methods for measuring the amount of fine particles such as PM accumulated in the DPF have been proposed, it is difficult to accurately measure the accumulated amount of fine particles such as PM, and an expensive large apparatus such as a network analyzer may be required for the measurement.

RELATED-ART DOCUMENTS

Patent Documents

[Patent Document 1] Japanese Laid-open Patent Publication No. H10-220219
[Patent Document 2] Japanese National Publication of International Patent Application No. 2012-507660
[Patent Document 3] Japanese Examined Patent Application Publication No. H5-44529
[Patent Document 4] Japanese Laid-open Patent Publication No. 2009-57948

SUMMARY

According to an aspect of the embodiments, a fine particle detector includes: a casing part configured to accommodate an object to be heated; an electromagnetic wave generating part configured to generate electromagnetic waves of different frequencies; at least one power sensor configured to measure powers, from the casing part, of the electromagnetic waves that have entered into the casing part; and a fine particle detection controlling part configured to determine, based on the powers of the electromagnetic waves of the different frequencies measured by the at least one power sensor, whether an accumulated amount of fine particles accumulated in the object to be heated is greater than or equal to a predetermined accumulated amount.

According to an aspect of the embodiments, an exhaust gas purification apparatus includes: the fine particle detector described above; and a fine particle collection part configured to collect the fine particles included in exhaust gas, wherein in a case where the accumulated amount of the fine particles accumulated in the fine particle collection part has reached the predetermined accumulated amount, the fine particle collection part is irradiated with a microwave generated in the electromagnetic wave generating part.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 7 is a flowchart of a method of detecting fine particles by a fine particle detector according to a third embodiment;

DESCRIPTION OF EMBODIMENT

Figure 1:
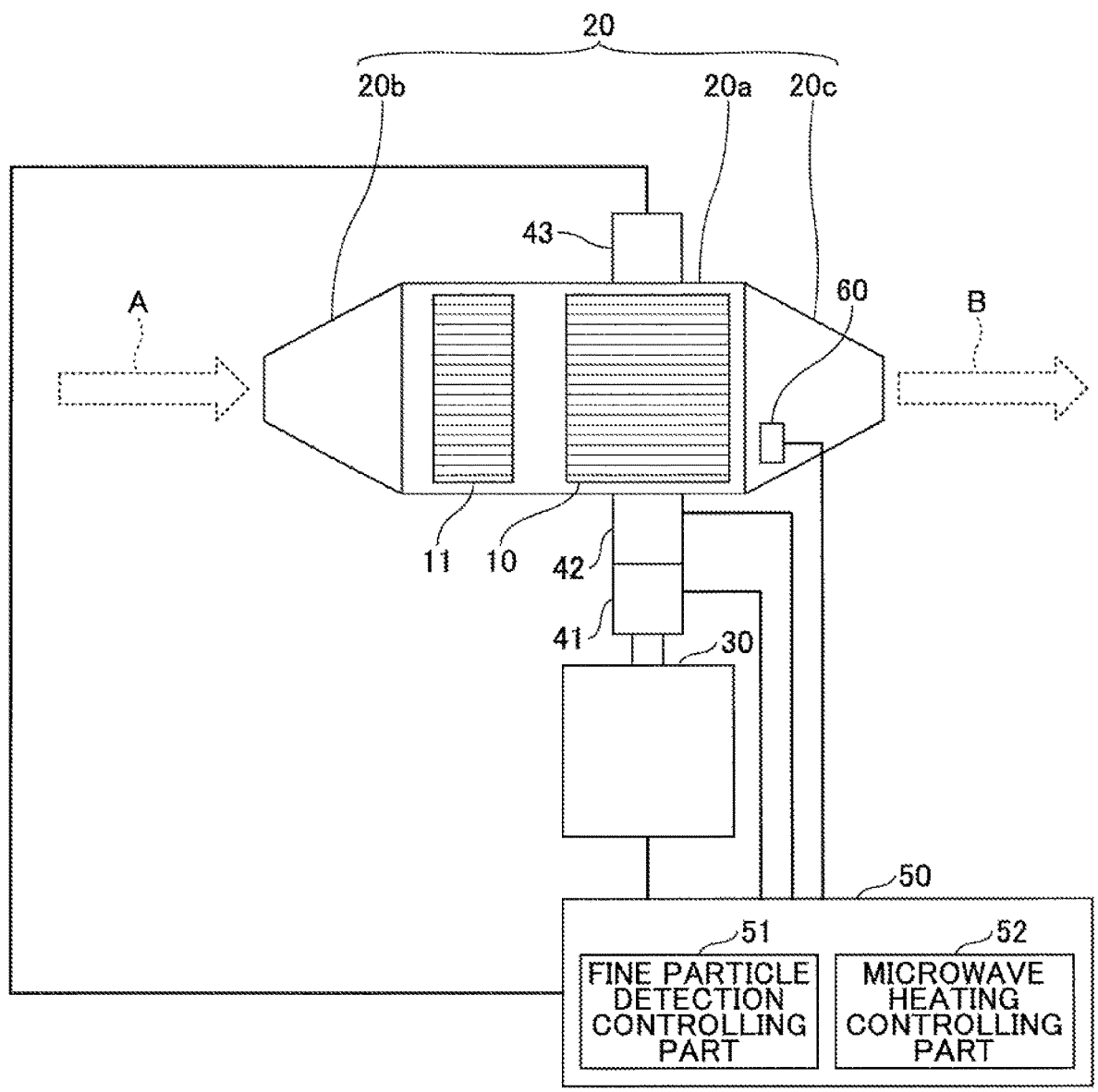
FIG. 1 is a diagram illustrating a structure of an exhaust gas purification apparatus according to a first embodiment.

Hereinafter, embodiments will be described. One aspect of the embodiments is to provide a fine particle detector that can accurately measure an amount of fine particles such as PM accumulated in a DPF at low cost. Note that the same reference numerals are given to the same members and the like to omit their Descriptions.

First Embodiment

Exhaust Gas Purification Apparatus

An exhaust gas purification apparatus according to a first embodiment will be described with reference to FIG. 1.

The exhaust gas purification apparatus according to the first embodiment includes a fine particle collection part 10, an oxidation catalyst part 11, a casing part 20, an electromagnetic wave generating part 30, an incidence power sensor 41, a reflection power sensor 42, a pass-through power sensor 43, a controlling part 50, a temperature measuring part 60, etc.

The fine particle collection part 10 serves as an object to be heated by the microwave heating apparatus in the first embodiment, and is formed of a Diesel Particulate Filter (DPF) or the like. The fine particle collection part 10 may collect fine particles included in exhaust gas. For example, the DPF is formed in a honeycomb structure in which adjacent vent holes are alternately closed, and the exhaust gas is discharged from vent holes different from the vent holes for the inlet. The oxidation catalyst part 11 is formed of an oxidation catalyst such as a Diesel Oxidation Catalyst (DOC).

The casing part 20 is formed of a metal material such as stainless steel and includes a casing body part 20a covering the periphery of the fine particle collection part 10 and the oxidation catalyst part 11, an inlet port 20b and an outlet port 20c coupled to the casing body part 20a. In the exhaust gas purification apparatus according to the first embodiment, exhaust such as exhaust gas from an engine etc., enters into the casing part 20 from the inlet port 20b from the direction indicated by the broken line arrow A, and passes through the oxidation catalyst part 11 and fine particle collection part 10 provided in the casing body part 20a. Thereby, the exhaust is purified. Thereafter, the exhaust purified in the oxidation catalyst part and the fine particle collection part 10 is discharged from the outlet port 20c in a direction indicated by the broken line arrow B.

In the casing part 20, the oxidation catalyst part 11 and the fine particle collection part 10 are arranged in this order from the inlet port 20b toward the outlet port 20c. The oxidation catalyst part 11 oxidizes the components contained in the exhaust gas entering through the inlet port 20b. For example, the oxidation catalyst part 11 converts NO contained in the exhaust gas into $NO_2$ having stronger oxidizability. In the fine particle collection part 10, fine particles such as PM are collected. Then, the $NO_2$ generated in the oxidation catalyst part 11 is used to burn and remove the collected fine particles such as PM. The fine particulates such as PM collected in the fine particle collection part 10 are soot or the like, and contain a large quantity of C (carbon). When burning and removing the fine particulates such as PM collected in the fine particle collection part 10, by flowing $NO_2$, C and $NO_2$ chemically react to produce $CO_2$. As a result, the fine particulates such as PM collected in the fine particle collection part 10 can be efficiently removed.

The electromagnetic wave generating part 30 is coupled to the casing part 20. For example, the electromagnetic wave generating part 30 can generate electromagnetic waves in a range of from 1 GHz to 5 GHz by changing the frequencies. Further, the electromagnetic wave generating part 30 can generate a high output microwave necessary for burning and removing fine particulates such as PM collected in the fine particle collection part 10. For example, the electromagnetic wave generating part 30 can generate microwaves whose frequencies are in a range of from 2.4 GHz to 2.5 GHz. A semiconductor element formed of one or more nitride semiconductors is used for the electromagnetic wave generating part 30.

The incidence power sensor 41 and the reflection power sensor 42 are provided between the casing part 20 and the electromagnetic wave generating part 30. The incidence power sensor 41 measures power of incident waves that enter into the casing part 20 from the electromagnetic wave generating part 30. The reflection power sensor 42 measures powers of reflected waves returned (reflected) from the casing part 20 among the electromagnetic waves that have entered into the casing part 20. Further, the pass-through power sensor 43 is provided at a position opposite to the electromagnetic wave generating part 30 with respect to the casing part 20. The pass-through power sensor 43 measures powers of electromagnetic waves that have passed through the fine particle collection part 10 among electromagnetic waves that have entered into the casing part 20. In this application, the electromagnetic waves detected by the pass-through power sensor 43 are referred to as pass-through waves or pass-through electromagnetic waves for the purpose of convenience.

The controlling part 50 includes a fine particle detection controlling part 51 and a microwave heating controlling part 52. The fine particle detection controlling part 51 mainly controls a fine particle detector. The microwave heating controlling part 52 mainly performs control to generate microwaves in the electromagnetic wave generating part 30 and to heat the fine particle collection part 10. The temperature measuring part 60 is attached to the casing part 20, and measures a temperature of the fine particle collection part 10 in the casing part 20. The temperature measuring part 60 may be a measure, such as a radiation thermometer, that can measure a temperature distribution at the fine particle collection part 10.

Figure 2:
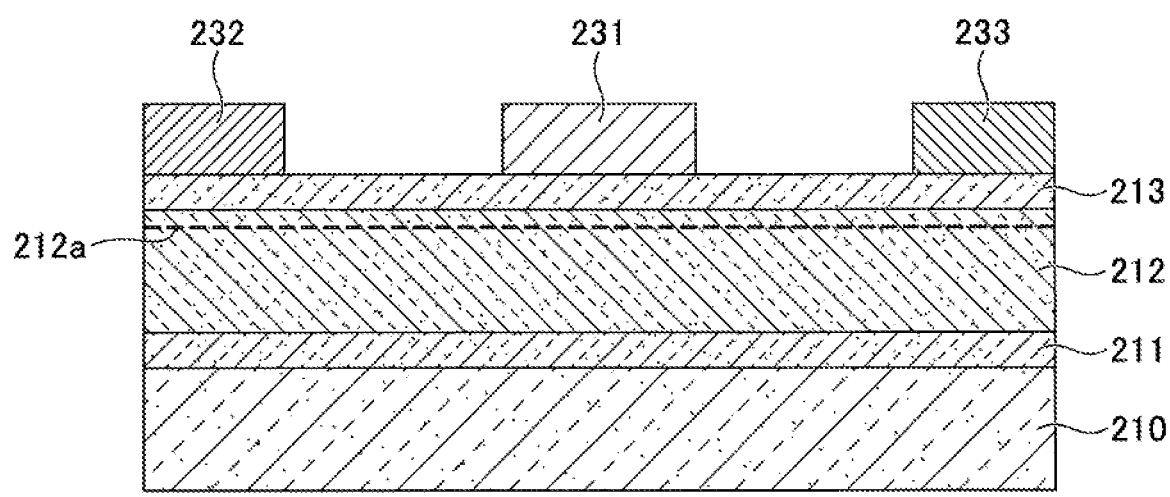
FIG. 2 is a diagram illustrating a structure of a semiconductor device used for generating electromagnetic waves.

According to the first embodiment, in order to generate electromagnetic waves by changing frequencies and to generate a high output microwave, the electromagnetic wave generating part 30 is formed of a semiconductor element. Specifically, the electromagnetic wave generating part 30 is formed of a High Electron Mobility Transistor (HEMT) using materials such as nitride semiconductors. As illustrated in FIG. 2, the HEMT using the nitride semiconductors is formed by laminating nitride semiconductor layers on a substrate 210 such as SiC, etc. That is, a buffer layer 211 formed of a material such as AlN or GaN, an electron transport layer 212, and an electron supply layer 213 are stacked in this order on the substrate 210. The electron transport layer 212 is formed of GaN, and the electron supply layer 213 is formed of AlGaN or InAlN. As a result, in the electron transport layer 212, a 2DEG 212a is generated in the vicinity of the interface with the electron supply layer 213. A gate electrode 231, a source electrode 232, and a drain electrode 233 are formed on the electron supply layer 213.

Fine Particle Detector

Next, a fine particle detector according to the first embodiment will be described with reference to FIG. 1. The fine particle detector according to the first embodiment includes the electromagnetic wave generating part 30, the incidence power sensor 41, the reflection power sensor 42, the pass-through power sensor 43, the fine particle detection controlling part 51, etc. The fine particle detector can detect an accumulated amount of fine particles such as PM accumulated in the fine particle collection part 10.

In a case where the electromagnetic wave generating part 30 generates electromagnetic waves of frequencies within a predetermined range to cause the electromagnetic waves to enter into the casing part 20 and when the accumulated amount of the fine particles such as PM in the fine particle collection part 10 increases, frequency characteristics of the reflection waves change. Specifically, the fine particle collection part 10 is housed inside the casing part 20 formed of stainless steel, and the electromagnetic waves emitted to the casing part 20 are repeatedly and multiply reflected in the casing part 20 thus pass through many times the inside of the fine particle collection part 10, which is arranged within the casing part 20. Here, the electromagnetic waves that have entered into the casing part 20 are absorbed by fine particles such as PM accumulated in the fine particle collection part 10. Thus, the electromagnetic waves that have entered into the casing part 20 are more absorbed by the fine particles such as PM accumulated in the fine particle collection part 10, in comparison with a case where electromagnetic waves pass through the inside of the fine particle collection part 10 only once.

Note that there is a resonant frequency for the casing part 20, in which the fine particle collection part 10 is accommodated (enclosed). When the accumulated amount of the fine particles such as PM in the fine particle collection part 10 changes, the electric permittivity in the casing part 20 to be a resonator changes and the resonant frequency changes. pass-through power sensor On the other hand, for frequencies that do not resonate, when the electromagnetic waves multiply reflected are absorbed by the fine particles such as PM accumulated in the fine particle collection part 10, the number of frequencies for which reflection wave power is extremely high and the number of frequencies for which reflection wave power is extremely low decrease.

The fine particle detector according to the first embodiment detects fine particles based on knowledge obtained through investigation by the inventors as described above, specifically, based on a decrease in the number of reflection waves with frequencies whose intensities are less than or equal to a predetermined intensity when the accumulated amount of the fine particles such as PM in the fine particle collection part 10 increases. Note that according to the first embodiment, electromagnetic waves whose frequencies are higher than the resonant frequency of the casing part 20 are used. For example, in a case where the entire length of the casing part 20 is approximately 1 m, the resonant frequency is approximately 300 MHz. Therefore, in this case, frequencies within a range of from 1 GHz to 5 GHz, which are higher than 300 MHz, are used for detecting fine particles.

Figure 3A:
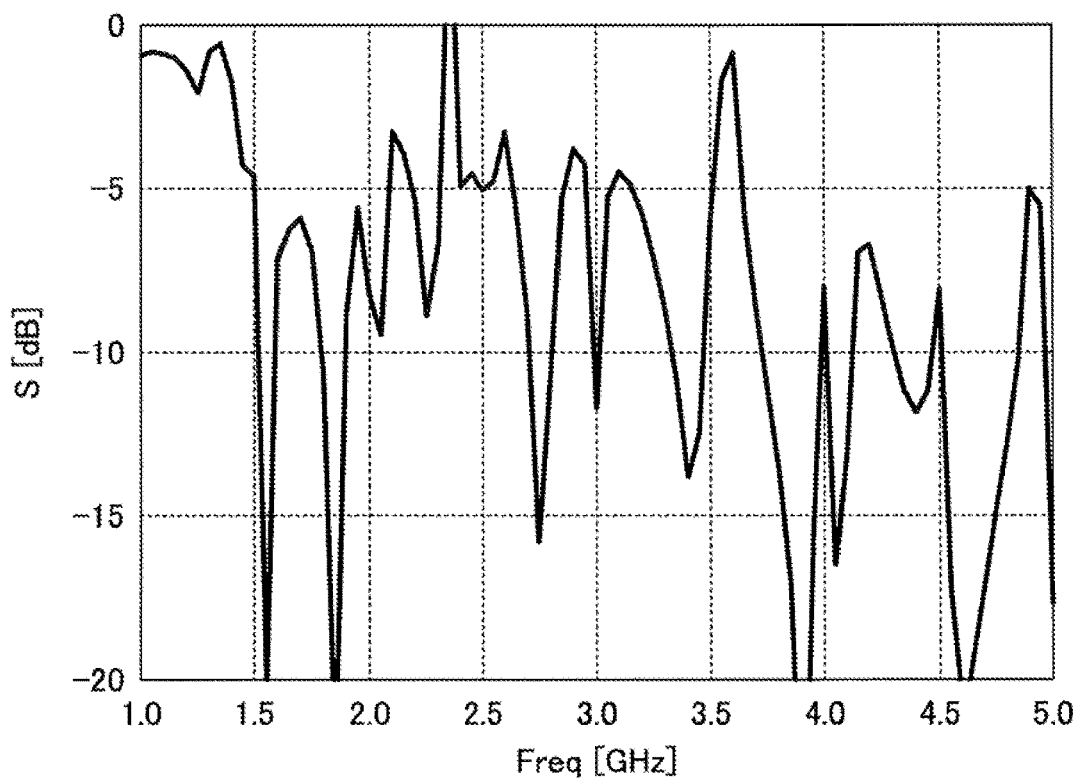
FIGS. 3A and 3B are graphs illustrating frequency characteristics of reflection waves of a fine particle detector according to the first embodiment.
Figure 3B:
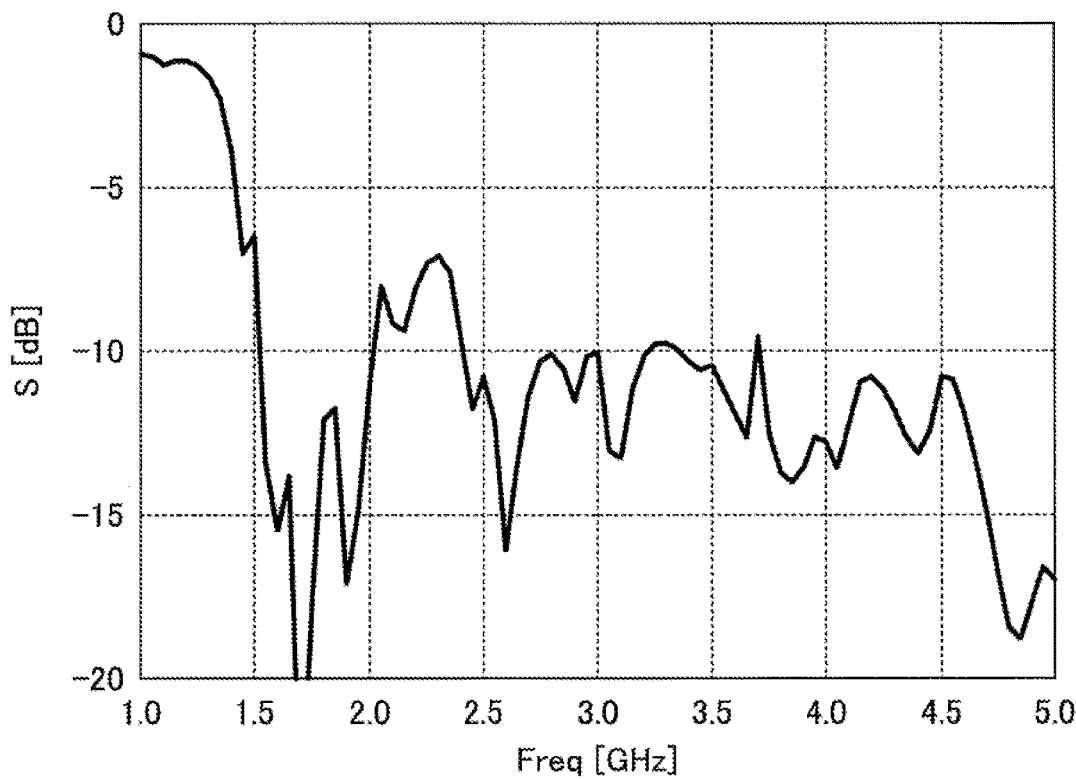

Specific descriptions will be given with reference to FIGS. 3A and 3B. FIGS. 3A and 3B illustrate intensity distributions of reflection waves when the electromagnetic wave generating part 30 generates electromagnetic waves whose frequencies differ at 50 MHz intervals in the range of from 1 GHz to 5 GHz to cause the electromagnetic waves to enter into the casing part 20. The intensities of the reflection waves are measured by the reflection power sensor 42. FIG. 3A illustrates the intensity distribution of the reflection waves in a state in which fine particles such as PM are not accumulated in the fine particle collection part 10. FIG. 3B illustrates the intensity distribution of the reflection waves in a state in which fine particles such as PM are accumulated in the fine particle collection part 10.

As illustrated in FIGS. 3A and 3B, upon fine particles such as PM being accumulated at the fine particle collection part 10, the number of frequencies of the reflection waves, whose powers are extremely high, and the number of frequencies of the reflection waves, whose powers are extremely low, decrease, and thus the powers of the reflection waves tend to become averaged.

Specifically, as illustrated in FIG. 3A, in the state in which fine particles such as PM are not accumulated in the fine particle collection part 10, the number of frequencies at which intensities are less than or equal to $-20$ dB is 6. The intensities of the waves are less than or equal to $-20$ dB at 1.65 GHz, 1.85 GHz, 3.90 GHz, 3.95 GHz, 4.60 GHz, and 4.65 GHz. On the other hand, as illustrated in FIG. 3B, in the state in which fine particles such as PM are accumulated in the fine particle collection part 10, the number of frequencies at which intensities are less than or equal to $-20$ dB is 2. The intensities of the waves are less than or equal to $-20$ dB at 1.70 GHz and 1.75 GHz.

According to the first embodiment, focusing on the above, it is detected that fine particles such as PM are accumulated in the fine particle collection part 10 for a predetermined accumulated amount, and determination is made by converting the powers of the reflection waves into logarithms as illustrated in FIGS. 3A and 3B.

Method of Detecting Fine Particles

Figure 4:
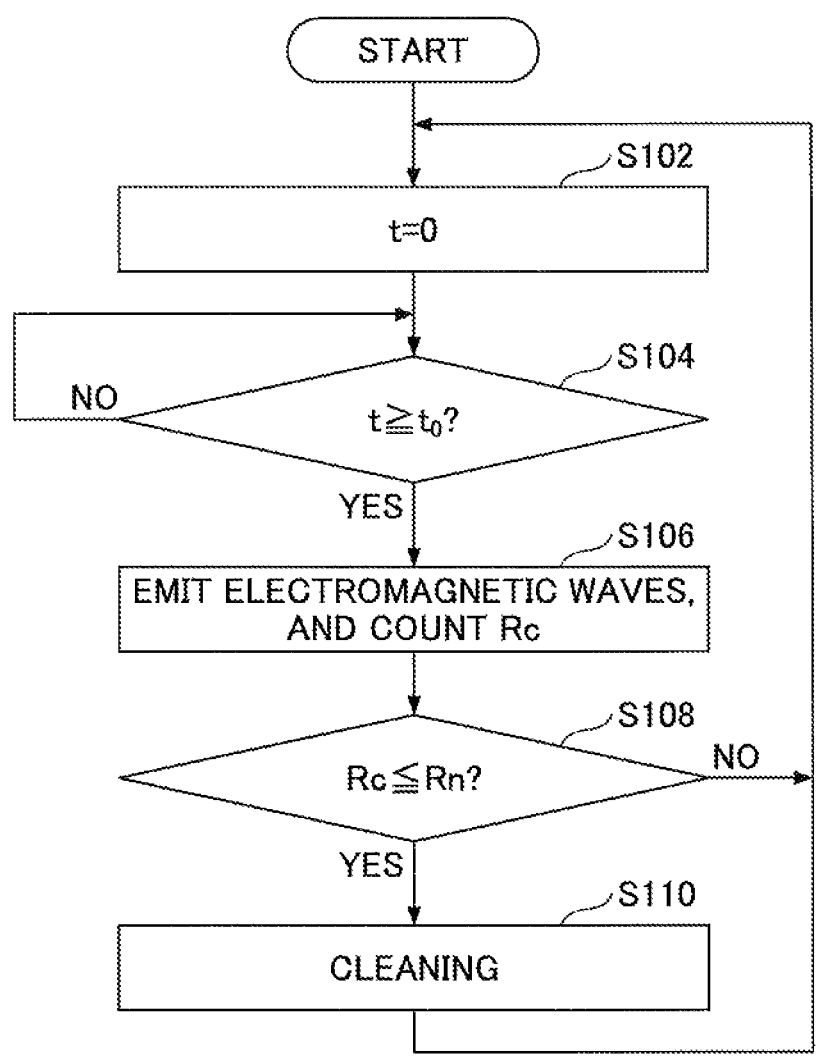
FIG. 4 is a flowchart of a method of detecting fine particles by the fine particle detector according to the first embodiment.

Next, a method of detecting fine particles using the fine particle detector according to the first embodiment will be described with reference to FIG. 4. Note that control, calculation, and the like in the following processes are performed by the fine particle detection controlling part 51 except for heating by a microwave.

First, 0 is set to a timer t to start to measure time in step S102.

Next, it is determined in step S104 whether the time of the timer t has passed a predetermined time $t_0$. In a case where the time of the timer t has passed the predetermined time $t_0$ (YES in step S104), the processing goes to step S106. In a case where the time of the timer t has not passed the predetermined time $t_0$ (NO in step S104), the process of step S104 is repeated.

Next, in step S106, electromagnetic waves of different frequencies are generated in the electromagnetic wave generating part 30 to emit the electromagnetic waves into the casing part 20. Then, powers of the reflection waves are measured to count the number Rc of frequencies of the reflection waves whose intensities are less than or equal to the predetermined intensity. Specifically, the frequencies generated by the electromagnetic wave generating part 30 are frequencies within a predetermined range. For example, the frequencies within a range of from 1 GHz to 5 GHz are generated in sequence at 50 MHz intervals. The powers of the reflection waves are measured in the reflection power sensor 42, and the values of the measured powers are sent to the fine particle detection controlling part 51. After converting the values of the powers into logarithmic values, the number Rc of frequencies whose intensities are less than or equal to the predetermined intensity is counted. For example, the number Rc of frequencies of the reflection waves whose intensities are less than or equal to −20 dB is counted.

Next, in step S108, it is determined whether the number Rc of frequencies of the waves, whose intensities are less than or equal to the predetermined intensity, is less than or equal to a predetermined number Rn. In a case where the number Rc of frequencies of the waves, whose intensities are less than or equal to the predetermined intensity, is less than or equal to the predetermined number Rn (YES in step S108), the processing goes to step S110 in order to perform cleaning of the fine particle collection part 10. On the other hand, in a case where the number Rc of frequencies of the waves, whose intensities are less than or equal to the predetermined intensity, is not less than or not equal to the predetermined number Rn (NO in step S108), the processing goes to step S102 because cleaning of the fine particle collection part 10 is not necessary.

Specifically, an embodiment in which the predetermined intensity is −20 dB and the predetermined number Rn is 3 will be described with reference to FIGS. 3A and 3B. For example, in the case illustrated in FIG. 3A, the number Rc of frequencies of the reflection waves whose powers are less than or equal to −20 dB is 6, which is greater than the predetermined number Rn that is 3. In this case, fine particles such as PM have not been accumulated in the fine particle collection part 10 for a predetermined amount. Therefore, it is not required to remove the fine particles such as PM in the fine particle collection part 10. Note that cleaning is required when the amount of fine particles accumulated in the fine particle collection part 10 has reached the predetermined amount. On the other hand, in the case illustrated in FIG. 3B, the number Rc of frequencies of the reflection waves whose powers are less than or equal to −20 dB is 2, which is less than the predetermined number Rn that is 3. In this case, fine particles such as PM have been accumulated in the fine particle collection part 10 for the predetermined amount. Therefore, it is required to remove the fine particles such as PM in the fine particle collection part 10. In other words, in a case where the number of electromagnetic waves whose detected powers are less than or equal to a predetermined power is less than or equal to the predetermined number Rn, the fine particle detection controlling part 51 may detect that the amount of fine particles accumulated in the fine particle collection part 10 is greater than or equal to the predetermined amount requiring cleaning.

As described above, by causing the reflection power sensor 42 to measure the powers of the electromagnetic waves reflected in the casing part 20, the fine particle detector according to the first embodiment can detect that the fine particles such as PM accumulated in the fine particle collection part 10 have accumulated for the predetermined amount or more.

Next, in step S110, cleaning is performed to remove the fine particles such as PM accumulated in the fine particle collection part 10. This cleaning may be performed by supplying a fuel such as light gas oil to the fine particle collection part 10 to burn the fuel. The cleaning may also be performed by control of the microwave heating controlling part 52 such that a microwave having a predetermined wavelength is generated in the electromagnetic wave generating part 30 to irradiate the fine particle collection part 10 with the generated microwave.

Note that the microwave emitting apparatus according to the first embodiment generates the microwave having the predetermined wavelength in the electromagnetic wave generating part 30 to irradiate the fine particle collection part 10 with the generated microwave. The frequency of the microwave generated at this time may be in a range of from 2.40 GHz to 2.50 GHz and may be equal to one of the frequencies of the electromagnetic waves generated in step S106. In this case, among the electromagnetic waves generated in step S106, an electromagnetic wave of frequency whose power of a reflection wave is less than or equal to −20 dB is preferable. In other words, it is preferable that the frequency of the microwave is equal to the frequency of an electromagnetic wave whose power of the reflection wave is less than or equal to −20 dB. For the electromagnetic waves of frequencies whose powers of the reflection waves are low, it is considered that most of the electromagnetic waves are absorbed by fine particles such as PM. Therefore, by emitting a microwave having such a frequency, it is possible to efficiently remove the fine particles such as PM accumulated in the fine particle collection part 10.

Further, the intensity of the microwave generated in the cleaning is higher than the intensities of electromagnetic waves generated in step S106. The intensities of the electromagnetic waves for detecting the accumulated amount of the fine particles such as PM in the fine particle collection part 10 may be low because it is sufficient for the electromagnetic waves to be able to detect the accumulated amount of the fine particles such as PM. However, the microwave for removing the fine particles such as PM requires a high intensity in order to heat and remove the fine particles such as PM.

Second Embodiment

Next, a second embodiment will be described. According to the second embodiment, an accumulated amount of fine particles such as PM in the fine particle collection part 10 is detected by emitting electromagnetic waves of different frequencies into the casing part 20 to measure the intensities of the electromagnetic waves that have passed through the fine particle collection part 10. Similar to the first embodiment, in a case where the electromagnetic waves of different frequencies are emitted into the casing part 20, the electromagnetic waves are repeatedly and multiply reflected in the casing part 20 and absorbed by the fine particles such as PM in the fine particle collection part 10. Thus, it is possible to detect the accumulated amount of the fine particles such as PM by measuring powers of the electromagnetic waves that have entered and passed through the casing part 20. According to the second embodiment, a fine particle detector is used that is similar to that of the first embodiment.

Figure 5:
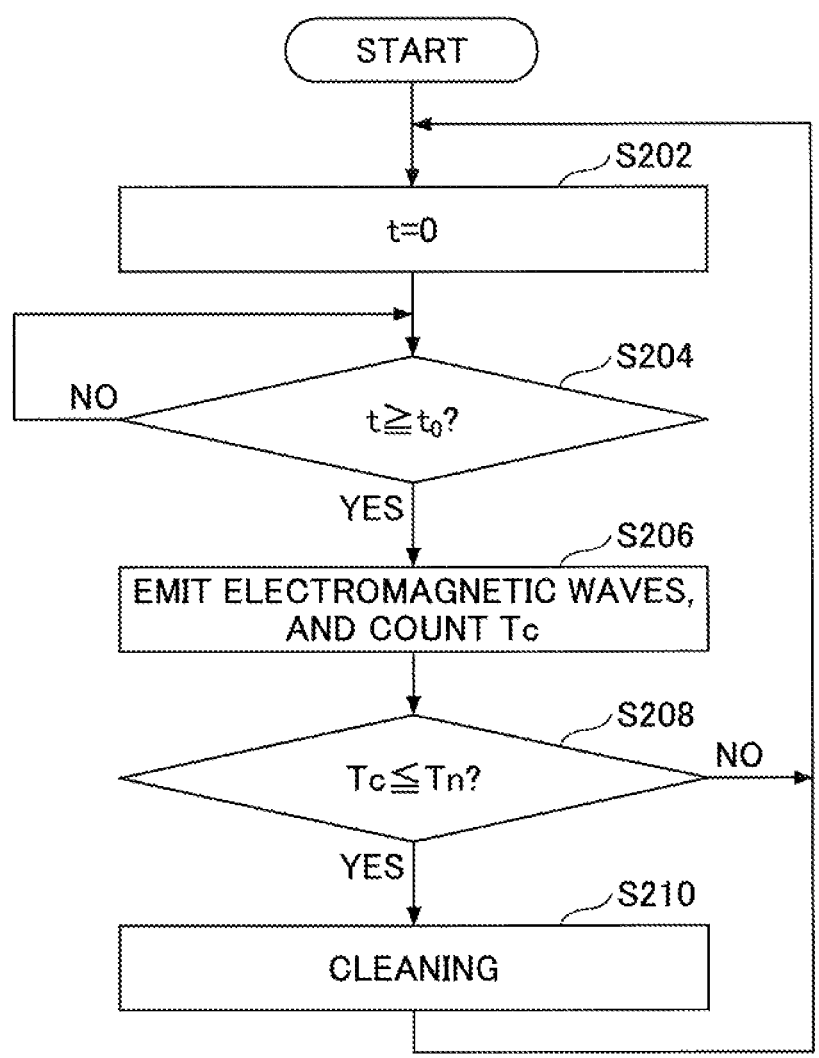
FIG. 5 is a flowchart of a method of detecting fine particles by a fine particle detector according to a second embodiment.

Next, a method of detecting fine particles according to the second embodiment will be described with reference to FIG. 5. Note that control, calculation, and the like in the following processes are performed by the fine particle detection controlling part 51 except for heating by a microwave.

First, 0 is set to a timer t to start to measure time in step S202.

Next, it is determined in step S204 whether the time of the timer t has passed a predetermined time $t_0$. In a case where the time of the timer t has passed the predetermined time $t_0$ (YES in step S204), the processing goes to step S206. In a case where the time of the timer t has not passed the predetermined time $t_0$ (NO in step S204), the process of step S204 is repeated.

Next, in step S206, electromagnetic waves of different frequencies are generated in the electromagnetic wave generating part 30 to emit the electromagnetic waves into the casing part 20. Then, powers of the pass-through waves are measured by the pass-through power sensor 43 to count the number Tc of frequencies of the waves whose intensities are less than or equal to the predetermined intensity. Specifically, the frequencies generated by the electromagnetic wave generating part 30 are frequencies within a predetermined range. For example, the frequencies within a range of from 1.5 GHz to 3.5 GHz are generated in sequence at 50 MHz intervals. The powers of the pass-through electromagnetic waves are measured in the pass-through power sensor 43 and the values of the measured power are sent to the fine particle detection controlling part 51. After converting the values of the powers into logarithmic values, the number Tc of frequencies of the waves whose intensities are less than or equal to the predetermined intensity is counted. For example, the number Tc of frequencies of the waves whose intensities are less than or equal to −35 dB is counted.

Next, in step S208, it is determined whether the number Tc of frequencies of the waves, whose intensities are less than or equal to the predetermined intensity, is less than or equal to a predetermined number Tn. In a case where the number Tc of frequencies of the waves, whose intensities are less than or equal to the predetermined intensity, is less than or equal to the predetermined number Tn (YES in step S208), the processing goes to step S210 in order to perform cleaning of the fine particle collection part 10. On the other hand, in a case where the number Tc of frequencies of the waves, whose intensities are less than or equal to the predetermined intensity, is not less than or not equal to the predetermined number Tn (NO in step S208), the processing goes to step S202 because cleaning of the fine particle collection part 10 is not necessary.

Figure 6A:
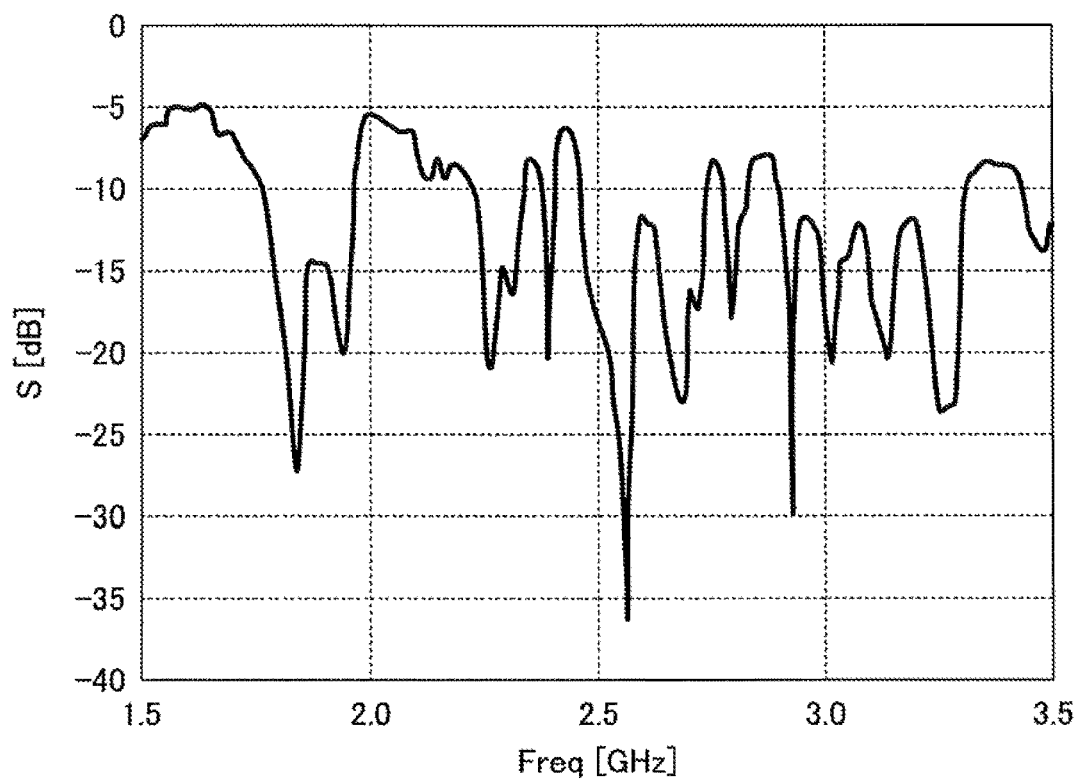
FIGS. 6A and 6B are graphs illustrating frequency characteristics of electromagnetic waves that have passed through the fine particle detector according to the second embodiment.
Figure 6B:
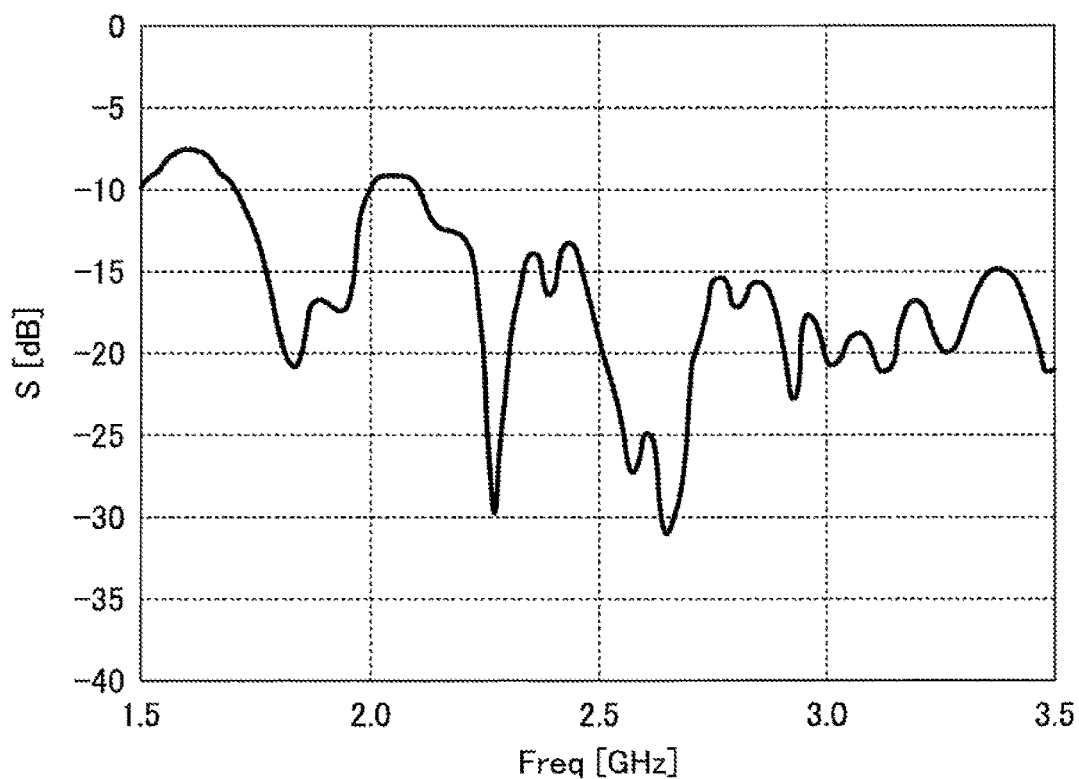

Specifically, an embodiment in which the predetermined intensity is −35 dB and the predetermined number Tn is 0 will be described with reference to FIGS. 6A and 6B. For example, in the case illustrated in FIG. 6A, the number Tc of frequencies of the pass-through electromagnetic waves whose power are less than or equal to −35 dB is 1, which is greater than the predetermined number Tn that is 0. In this case, fine particles such as PM have not been accumulated in the fine particle collection part 10 for a predetermined amount. Therefore, it is not required to remove the fine particles such as PM in the fine particle collection part 10. Note that cleaning is required when the amount of fine particles accumulated in the fine particle collection part 10 has reached the predetermined amount. On the other hand, in the case illustrated in FIG. 6B, the number Tc of frequencies of the pass-through electromagnetic waves whose powers are less than or equal to −35 dB is 0, which is the same as the predetermined number Tn that is 0. In this case, fine particles such as PM have been accumulated in the fine particle collection part 10 for the predetermined amount. Therefore, it is required to remove the fine particles such as PM in the fine particle collection part 10.

As described above, by causing the pass-through power sensor 43 to measure the powers of the electromagnetic waves that have passed through the fine particle collection part 10, the fine particle detector according to the second embodiment can detect that the fine particles such as PM accumulated in the fine particle collection part 10 have accumulated for the predetermined amount or more.

Next, in step S210, cleaning is performed to remove the fine particles such as PM accumulated in the fine particle collection part 10. This cleaning may be performed by supplying a fuel such as light gas oil to the fine particle collection part 10 to burn the fuel. The cleaning may also be performed by control of the microwave heating controlling part 52 such that a microwave having a predetermined wavelength is generated in the electromagnetic wave generating part 30 to irradiate the fine particle collection part 10 with the generated microwave.

Note that the microwave emitting apparatus according to the second embodiment generates the microwave having the predetermined wavelength in the electromagnetic wave generating part 30 to irradiate the fine particle collection part 10 with the generated microwave. The frequency of the microwave generated at this time may be in a range of from 2.40 GHz to 2.50 GHz and may be equal to one of the frequencies of the electromagnetic waves generated in step S206. In this case, among the electromagnetic waves generated in step S206, an electromagnetic wave of frequency whose power of a pass-through wave is less than or equal to −35 dB is preferable. In other words, it is preferable that the frequency of the microwave is equal to the frequency of the electromagnetic wave whose power of the wave that has passed through the fine particle collection part 10 is less than or equal to −35 dB. For the electromagnetic waves of frequencies whose powers that have passed through the fine particle collection part 10 are low, it is considered that most of the electromagnetic waves are absorbed by fine particles such as PM. Therefore, by emitting a microwave having such a frequency, it is possible to efficiently remove the fine particles such as PM accumulated in the fine particle collection part 10. The intensity of the microwave generated in the cleaning is higher than the intensities of electromagnetic waves generated in step S206.

Note that other configurations and processes of the second embodiment are similar to those of the first embodiment. Further, the second embodiment may be combined with the first embodiment. That is, accuracy of detecting the accumulated amount of fine particles such as PM can be enhanced by detecting both the reflection waves and the pass-through electromagnetic waves to make the determination. In other words, the fine particle detector may use at least one of the reflection power sensor 42 and the pass-through power sensor 43 to measure powers, from the casing part 20, of the electromagnetic waves that have entered into the casing part 20. For example, according to the first embodiment, the reflection power sensor 42 measures powers of electromagnetic waves reflected in the casing part 20 among the electromagnetic waves emitted to the casing part 20 from the electromagnetic wave generating part 30. For example, according to the second embodiment, the pass-through sensor 43 measures powers of electromagnetic waves that have passed through the fine particle collection part 10 among the electromagnetic waves emitted to the casing part 20 from the electromagnetic wave generating part 30. Then, the fine particle detection controlling part may determine, based on the measured powers of the electromagnetic waves having different frequencies, whether an amount of fine particles accumulated at the fine particle collection part 10 is greater than or equal to a predetermined accumulated amount requiring cleaning.

Third Embodiment

Next, a third embodiment will be described. A fine particle detector according to the third embodiment determines that the accumulated amount of fine particles such as PM in the fine particle collection part 10 has reached the predetermined amount and determined that cleaning is required, in a case where all values of the reflection waves are less than or equal to a predetermined value, with respect to the electromagnetic waves whose frequencies are within a predetermined range. Specifically, when the accumulated amount of the fine particles such as PM in the fine particle collection part 10 increases, electromagnetic waves to be absorbed also increase, and therefore powers of the reflection waves and powers of the pass-through electromagnetic waves decrease. For example, the powers of the reflection waves in a state in which fine particles such as PM are accumulated in the fine particle collection part 10 as illustrated in FIG. 3B are overall lower than the powers of the reflection waves in a state in which fine particles such as PM are not accumulated in the fine particle collection part 10 as illustrated in FIG. 3A. Specifically, as illustrated in FIG. 3A, in the state in which the fine particles such as PM are not accumulated in the fine particle collection part 10, a plurality of electromagnetic waves of frequencies whose powers of the reflection waves are greater than or equal to −5 dB are present in the range of from 1.5 GHz to 5.0 GHz. On the other hand, as illustrated in FIG. 3B, in the state in which the fine particles such as PM are accumulated in the fine particle collection part 10, there are no electromagnetic waves of frequencies whose powers of the reflection waves are greater than or equal to −5 dB in the range of from 1.5 GHz to 5.0 GHz. Similarly, the pass-through electromagnetic waves also have such tendencies.

Next, a method of detecting fine particles according to the third embodiment will be described with reference to FIG. 7. Note that control, calculation, and the like in the following processes are performed by the fine particle detection controlling part 51 except for heating by a microwave.

First, 0 is set to a timer t to start to measure time in step S302.

Next, it is determined in step S304 whether the time of the timer t has passed a predetermined time $t_0$. In a case where the time of the timer t has passed the predetermined time $t_0$ (YES in step S304), the processing goes to step S306. In a case where the time of the timer t has not passed the predetermined time $t_0$ (NO in step S304), the process of step S304 is repeated.

Next, in step S306, electromagnetic waves of different frequencies are generated in the electromagnetic wave generating part 30 to emit the electromagnetic waves into the casing part 20. Then, powers of the reflection waves are measured to count the number Rp of frequencies of the waves whose intensities are greater than or equal to the predetermined intensity. Specifically, the frequencies generated by the electromagnetic wave generating part 30 are frequencies within a predetermined range. For example, the frequencies within a range of from 1.5 GHz to 5.0 GHz are generated in sequence at 50 MHz intervals. The powers of the reflection waves are measured in the reflection power sensor 42, and the values of the measured powers are sent to the fine particle detection controlling part 51. After converting the values of the powers into logarithmic values, the number Rp of frequencies of the waves whose intensities are greater than or equal to the predetermined intensity is counted. For example, the number Rc of frequencies of the waves whose intensities are greater than or equal to −5 dB is counted.

Next, in step S308, it is determined whether the number Rp of frequencies of the waves, whose intensities are greater than or equal to the predetermined intensity, is 0. In a case where the number Rp of frequencies of the waves, whose intensities are greater than or equal to the predetermined intensity, is 0 (YES in step S308), the processing goes to step S310 in order to perform cleaning of the fine particle collection part 10. On the other hand, in a case where the number Rp of frequencies of the waves, whose intensities are greater than or equal to the predetermined intensity, is not 0 (NO in step S308), the processing goes to step S302 because cleaning of the fine particle collection part 10 is not necessary.

Specifically, an embodiment in which the predetermined intensity is −5 dB and the predetermined number Rn is 3 will be described with reference to FIGS. 3A and 3B. For example, in the case illustrated in FIG. 3A, in the range of from 1.5 GHz to 5.0 GHz, the number Rp of frequencies of the waves whose powers of the reflection waves are greater than or equal to −5 dB is two or more, and is greater than 1. In this case, fine particles such as PM have not been accumulated in the fine particle collection part 10 for a predetermined amount. Therefore, it is not required to remove the fine particles such as PM in the fine particle collection part 10. Note that cleaning is required when the amount of fine particles accumulated in the fine particle collection part 10 has reached the predetermined amount. On the other hand, in the case illustrated in FIG. 3B, in the range of from 1.5 GHz to 5.0 GHz, there are no frequencies of waves whose powers of the reflection waves are greater than or equal to −5 dB. Therefore, Rp is 0. In this case, fine particles such as PM have been accumulated in the fine particle collection part 10 for the predetermined amount. Therefore, it is required to remove the fine particles such as PM in the fine particle collection part 10. In other words, in a case where electromagnetic waves whose detected powers are greater than or equal to a predetermined power are absent, the fine particle detection controlling part 51 may detect that the amount of fine particles accumulated in the fine particle collection part 10 is greater than or equal to the predetermined amount.

As described above, by causing the reflection power sensor 42 to measure the powers of the electromagnetic waves reflected in the casing part 20, the fine particle detector according to the third embodiment can detect that the fine particles such as PM accumulated in the fine particle collection part 10 have accumulated for the predetermined amount or more.

Next, in step S310, cleaning is performed to remove the fine particles such as PM accumulated in the fine particle collection part 10.

Note that in the third embodiment, pass-through electromagnetic waves may be used (measured) instead of the reflection waves. Other configurations and processes of the third embodiment are similar to those of the first embodiment.

Fourth Embodiment

Next, a fourth embodiment will be described. A fine particle detector according to the fourth embodiment detects fine particles based on an integral quantity obtained by frequency-integrating powers of the pass-through electromagnetic waves that have passed through the fine particle collection part 10. Specifically, when the accumulated amount of the fine particles such as PM in the fine particle collection part 10 increases, electromagnetic waves to be absorbed also increase, and therefore powers of the reflection waves and powers of the pass-through electromagnetic waves decrease. For example, an integral quantity obtained by frequency-integrating the powers of the pass-through waves in a state in which fine particles such as PM are accumulated in the fine particle collection part 10 as illustrated in FIG. 6B is lower than an integral quantity obtained by frequency-integrating the powers of the reflection waves in a state in which fine particles such as PM are not accumulated in the fine particle collection part 10 as illustrated in FIG. 6A.

Figure 8:
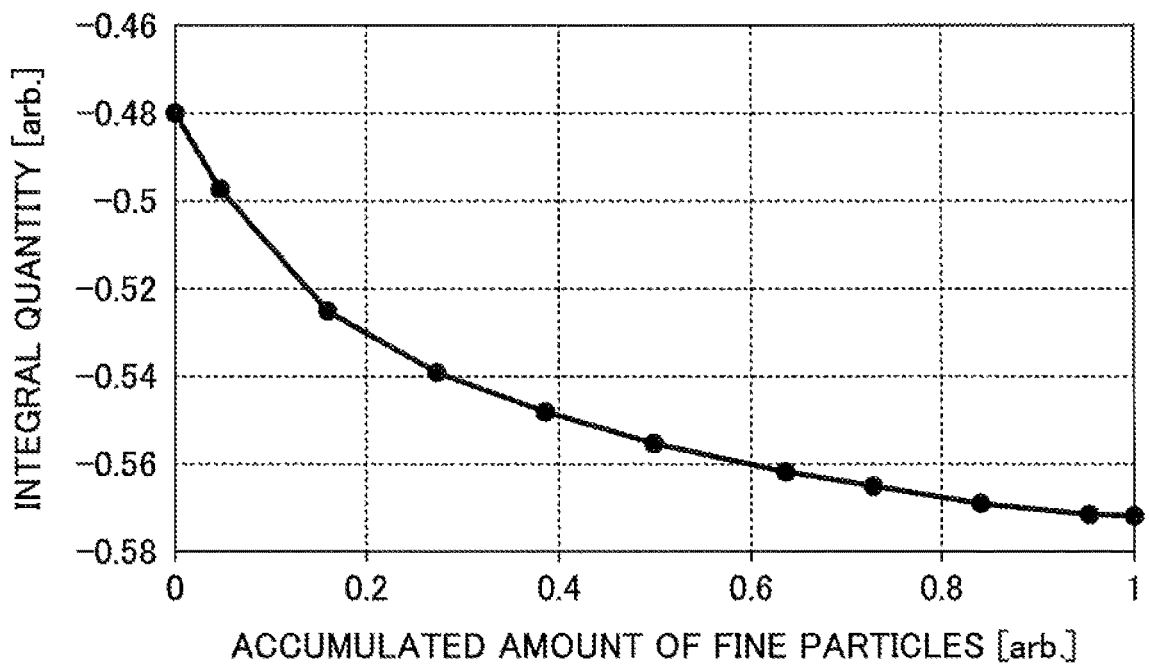
FIG. 8 is a graph illustrating a correlation between an integral quantity, obtained by frequency-integrating intensities of pass-through electromagnetic waves, and an accumulated amount of fine particles.
Figure 9:
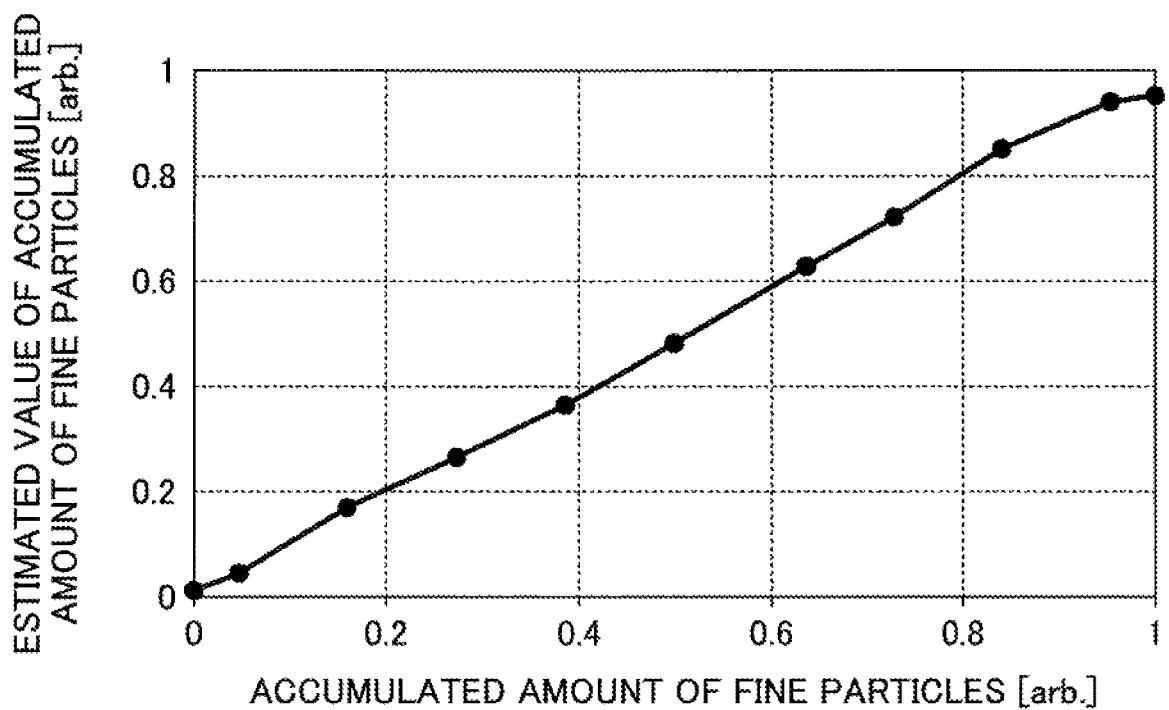
FIG. 9 is a graph illustrating a correlation between an estimated value of the accumulated amount of the fine particles and the actual accumulated amount of the fine particles according to a fourth embodiment.

That is, as illustrated in FIG. 8, when the accumulated amount of the fine particles increases, the integral quantity obtained by frequency-integrating the powers of the pass-through electromagnetic waves tends to decrease. Accordingly, in a case where the integral quantity obtained by frequency-integrating the powers of the pass-through electromagnetic waves has reached a predetermined value or less, it is possible to detect that the accumulated amount of fine particles such as PM in the fine particle collection part 10 has reached an amount requiring cleaning. Note that FIG. 9 is a graph illustrating a correlation between the estimated value of the accumulated amount of the fine particles, calculated from the integral quantity obtained by frequency-integrating the powers of the pass-through electromagnetic waves, and the actual accumulated amount of the fine particles, showing a substantially linear relationship.

In this application, the integral quantity obtained by frequency-integrating the powers of the pass-through electromagnetic waves is not limited to the integral quantity obtained by actually frequency-integrating the power of the pass-through electromagnetic waves. For example, the integral quantity may be a sum of measured values that are obtained by measuring power of a pass-through electromagnetic wave for each predetermined frequency, which may be at 50 MHz intervals.

Figure 10:
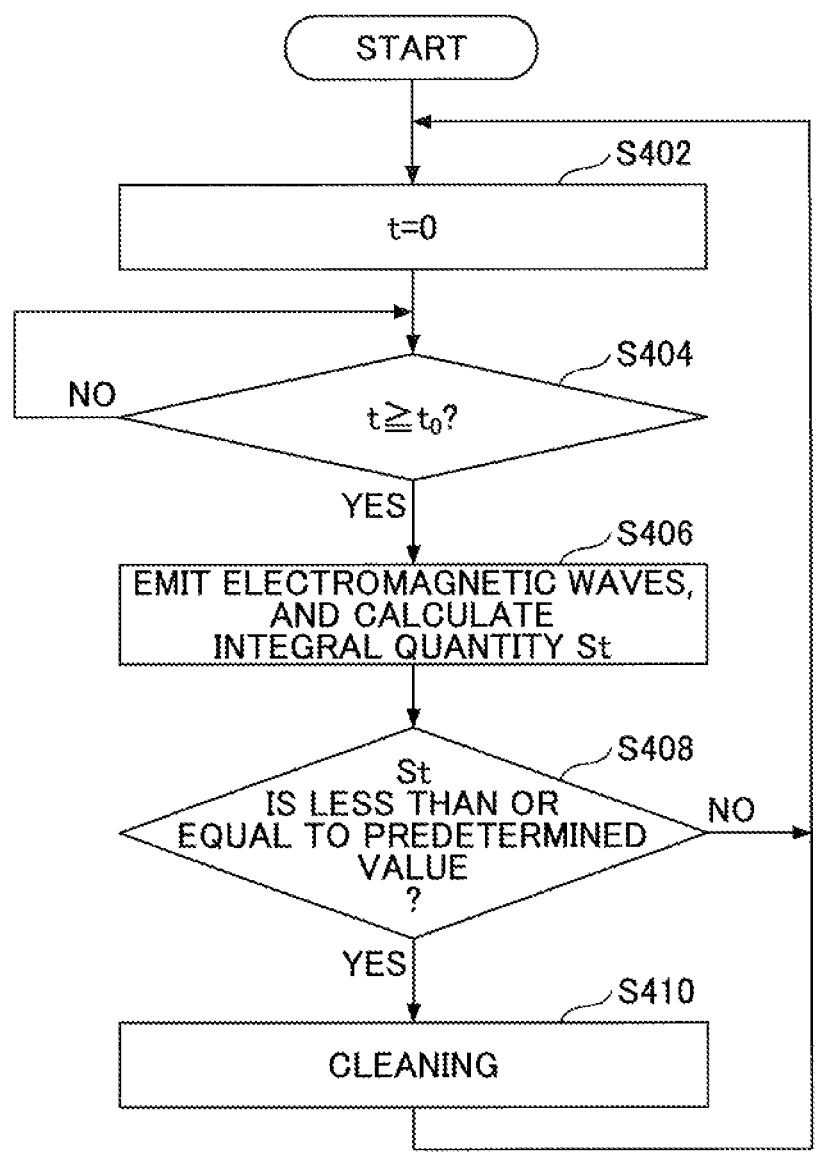
FIG. 10 is a flowchart of a method of detecting fine particles by a fine particle detector according to the fourth embodiment.

Next, a method of detecting fine particles according to the second embodiment will be described with reference to FIG. 10. Note that control, calculation, and the like in the following processes are performed by the fine particle detection controlling part 51 except for heating by a microwave.

First, 0 is set to a timer t to start to measure time in step S402.

Next, it is determined in step S404 whether the time of the timer t has passed a predetermined time $t_0$. In a case where the time of the timer t has passed the predetermined time $t_0$ (YES in step S404), the processing goes to step S406. In a case where the time of the timer t has not passed the predetermined time $t_0$ (NO in step S404), the process of step S404 is repeated.

Next, in step S406, electromagnetic waves of different frequencies are generated in the electromagnetic wave generating part 30 to emit the electromagnetic waves into the casing part 20. Then, powers of the pass-through waves, which have passed through the fine particle collection part 10, are measured and integrated to obtain an integral quantity St obtained by frequency-integrating the powers of the pass-through electromagnetic waves. Specifically, the frequencies generated by the electromagnetic wave generating part 30 are frequencies within a predetermined range. For example, the frequencies within a range of from 1.5 GHz to 3.5 GHz are generated in sequence at 50 MHz intervals. The powers of the pass-through electromagnetic waves are measured in the pass-through power sensor 43 and the values of the measured powers are sent to the fine particle detection controlling part 51. After converting the values of the powers into logarithmic values, the integral quantity St is obtained by frequency-integrating the powers of the pass-through electromagnetic waves.

Next, in step S408, it is determined whether the integral quantity St is less than or equal to a predetermined value. In a case where the integral quantity St is less than or equal to the predetermined value (YES in step S408), the processing goes to step S410 in order to perform cleaning of the fine particle collection part 10. In other words, in a case where the integral quantity St obtained by frequency-integrating the powers of the electromagnetic waves is less than or equal to the predetermined value, the fine particle detection controlling part 51 may detect that the amount of fine particles accumulated in the fine particle collection part 10 is greater than or equal to the predetermined amount requiring cleaning. On the other hand, in a case where the integral quantity St is not less than or not equal to the predetermined value (NO in step S408), the processing goes to step S402 because cleaning of the fine particle collection part 10 is not necessary.

Next, in step S410, cleaning is performed to remove the fine particles such as PM accumulated in the fine particle collection part 10.

Note that in the fourth embodiment, reflection waves may be used (measured) instead of the pass-through electromagnetic waves. Other configurations and processes of the fourth embodiment are similar to those of the first embodiment.

Fifth Embodiment

Next, a fifth embodiment will be described. A fine particle detector according to the fifth embodiment detects fine particles based on an integral quantity obtained by frequency-integrating absolute values of frequency-differential values of powers of the pass-through electromagnetic waves that have passed through the fine particle collection part 10. Specifically, when the accumulated amount of fine particles such as PM in the fine particle collection part 10 increases, peaks of the powers of the pass-through electromagnetic waves decrease and bottoms (troughs) of the powers increase and thus the powers tend to be averaged. The reflection waves have similar tendencies. For example, the powers are more averaged in the state in which fine particles such as PM are accumulated in the fine particle collection part 10 as illustrated in FIG. 6B than in the state in which fine particles such as PM are not accumulated in the fine particle collection part 10 as illustrated in FIG. 6A. Accordingly, the integral quantity obtained by frequency-integrating absolute values of frequency-differential values of powers of the pass-through electromagnetic waves becomes lower in FIG. 6B.

Figure 11:
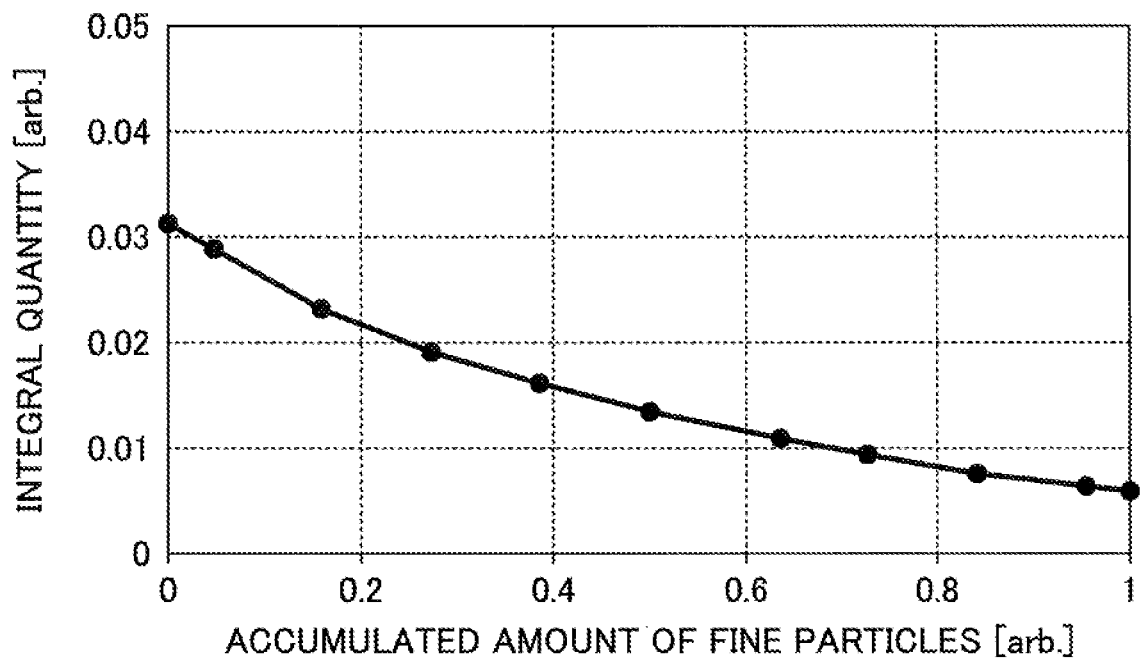
FIG. 11 is a graph illustrating a correlation between an integral quantity, obtained by frequency-integrating absolute values of frequency-differential values of the intensities of the pass-through electromagnetic waves, and the accumulated amount of the fine particles.
Figure 12:
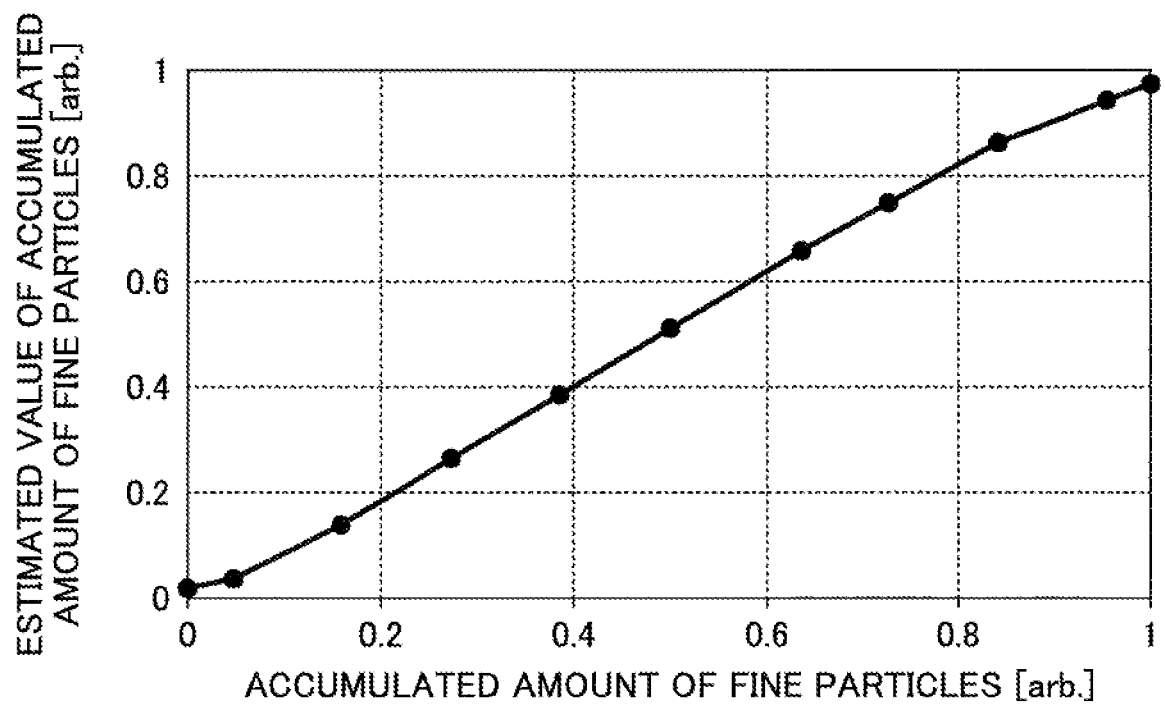
FIG. 12 is a graph illustrating a correlation between an estimated value of the accumulated amount of the fine particles and the actual accumulated amount of the fine particles according to a fifth embodiment.

That is, as illustrated in FIG. 11, when the accumulated amount of the fine particles increases, the integral quantity obtained by frequency-integrating the absolute values of the frequency-differential values of the powers of the pass-through electromagnetic waves decreases. Thus, in a case where the integral quantity, obtained by frequency-integrating the absolute values of the frequency-differential values of the powers of the pass-through electromagnetic waves, has reached a predetermined value or less, it is possible to detect that the accumulated amount of fine particles such as PM in the fine particle collection part 10 has reached an amount of requiring cleaning. Note that FIG. 12 is a graph illustrating a correlation between the estimated value of the accumulated amount of the fine particles, calculated from the integral quantity obtained by frequency-integrating the absolute values of the frequency-differential values of the powers of the pass-through electromagnetic waves, and the actual accumulated amount of the fine particles, showing a substantially linear relationship.

Figure 13:
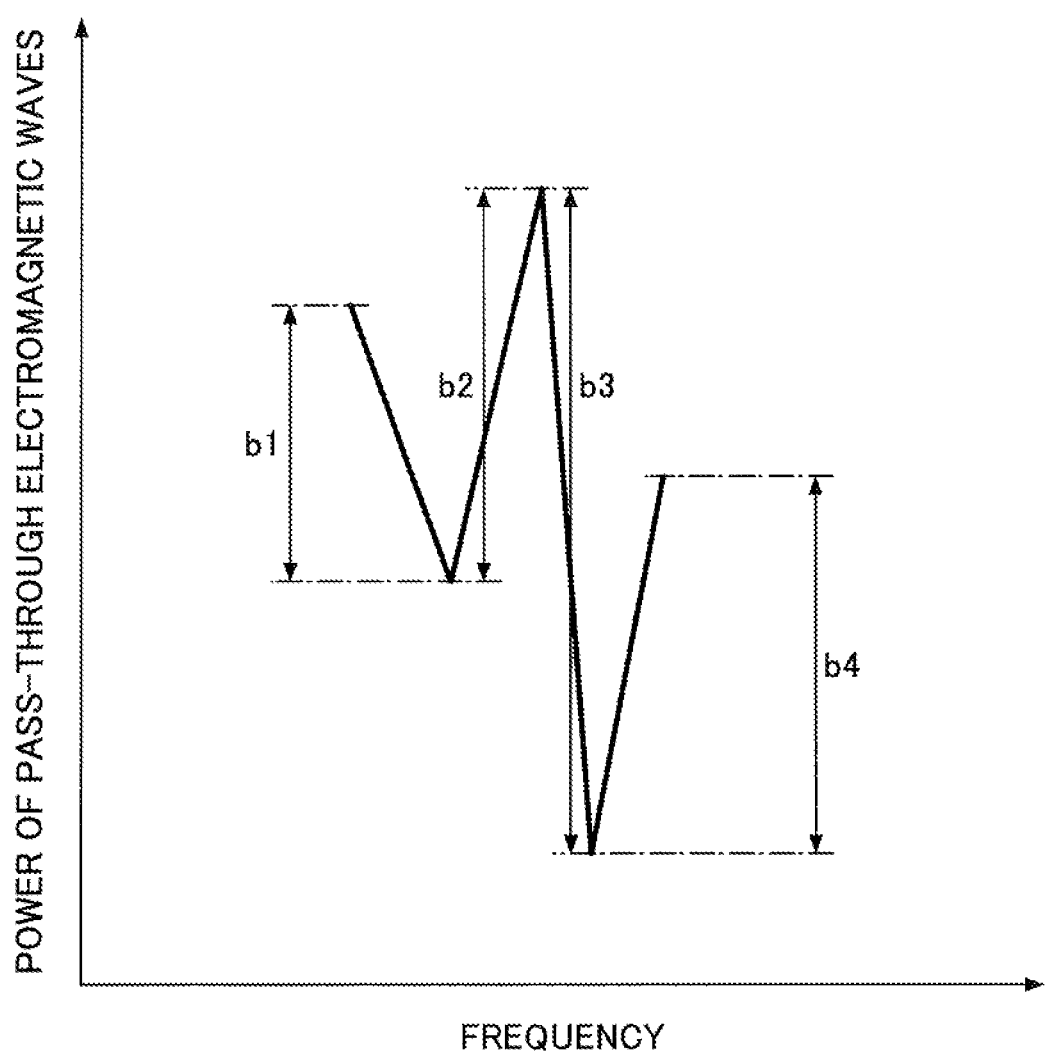
FIG. 13 is a graph describing the integral quantity, obtained by frequency-integrating the absolute values of the frequency-differential values of the intensities of the pass-through electromagnetic waves.

In this application, the integral quantity obtained by frequency-integrating the absolute values of the frequency-differential values of the powers of the pass-through electromagnetic waves is not limited to the actual integral quantity. For example, the integral quantity may be a value obtained by integrating absolute values of differences that are obtained by calculating differences between the powers of the pass-through electromagnetic waves for respective predetermined adjacent frequencies, for example, for respective 50 MHz intervals. Specifically, as illustrated in FIG. 13, the differences between the powers of the pass-through electromagnetic waves having adjacent frequencies are calculated to integrate absolute values of the calculated differences, then, the value obtained by integrating the absolute values is the integral quantity, obtained by frequency-integrating the absolute values of the frequency-differential values of the powers of the pass-through electromagnetic waves. For example, when the differences between the powers of the pass-through electromagnetic waves having adjacent frequencies are b1, b2, b3, and b4 in this order, the integral quantity Sb, obtained by frequency-integrating the absolute values of the frequency-differential values of the powers of the pass-through electromagnetic waves, is equal to $|b1|+|b2|+|b3|+|b4|+\ldots$.

Figure 14:
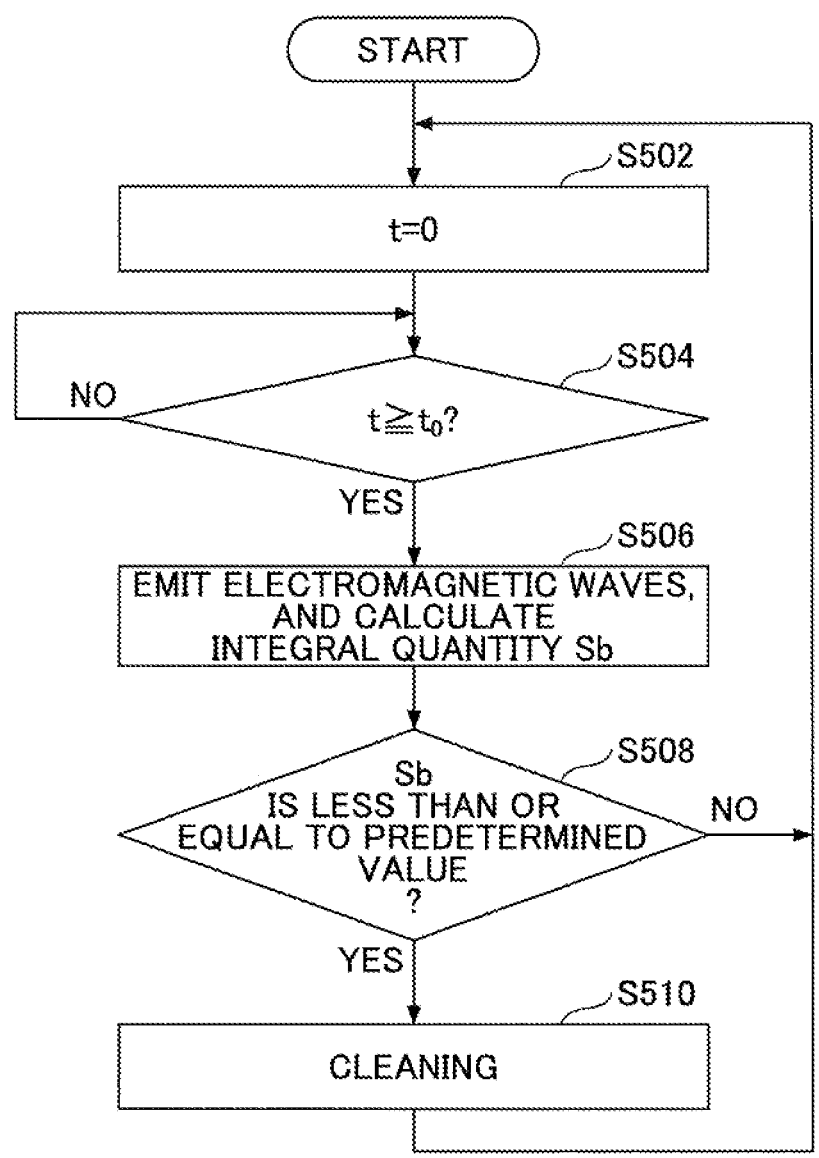
FIG. 14 is a flowchart of a method of detecting fine particles by a fine particle detector according to the fifth embodiment.

Next, a method of detecting fine particles according to the fifth embodiment will be described with reference to FIG. 14. Note that control, calculation, and the like in the following processes are performed by the fine particle detection controlling part 51 except for heating by a microwave.

First, 0 is set to a timer t to start to measure time in step S502.

Next, it is determined in step S504 whether the time of the timer t has passed a predetermined time $t_0$. In a case where the time of the timer t has passed the predetermined time $t_0$ (YES in step S504), the processing goes to step S506. In a case where the time of the timer t has not passed the predetermined time $t_0$ (NO in step S504), the process of step S504 is repeated.

Next, in step S506, electromagnetic waves of different frequencies are generated in the electromagnetic wave generating part 30 to emit the electromagnetic waves into the casing part 20. Then, powers of the pass-through waves, which have passed through the fine particle collection part 10, are measured. The differences of the powers of the electromagnetic waves having adjacent frequencies are calculated, based on the powers of the pass-through electromagnetic waves obtained as described above, to integrate the absolute values of the calculated differences. Thereby, an integral quantity Sb, obtained by frequency-integrating the absolute values of the frequency-differential values of the powers of the pass-through electromagnetic waves, is obtained. Specifically, the frequencies generated by the electromagnetic wave generating part 30 are frequencies within a predetermined range. For example, the frequencies within a range of from 1.5 GHz to 3.5 GHz are generated in sequence at 50 MHz intervals. The powers of the pass-through electromagnetic waves are measured in the pass-through power sensor 43 and the values of the measured powers are sent to the fine particle detection controlling part 51. After converting the values of the powers into logarithmic values, the integral quantity Sb is obtained by frequency-integrating the absolute values of the frequency-differential values of the powers of the pass-through electromagnetic waves.

Next, in step S508, it is determined whether the integral quantity Sb is less than or equal to a predetermined value. In a case where the integral quantity Sb is less than or equal to the predetermined value (YES in step S508), the processing goes to step S510 in order to perform cleaning of the fine particle collection part 10. In other words, in a case where the integral quantity Sb obtained by frequency-integrating the absolute values of the frequency-differential values of the detected powers is less than or equal to the predetermined value, the fine particle detection controlling part 51 may detect that the amount of fine particles accumulated in the fine particle collection part 10 is greater than or equal to the predetermined amount requiring cleaning. On the other hand, in a case where the integral quantity Sb is not less than or not equal to the predetermined value (NO in step S508), the processing goes to step S502 because cleaning of the fine particle collection part 10 is not necessary.

Next, in step S510, cleaning is performed to remove the fine particles such as PM accumulated in the fine particle collection part 10.

Note that in the fifth embodiment, reflection waves may be used (measured) instead of the pass-through electromagnetic waves. Further, other configurations and processes of the fifth embodiment are similar to those of the first embodiment.

Sixth Embodiment

Figure 15:
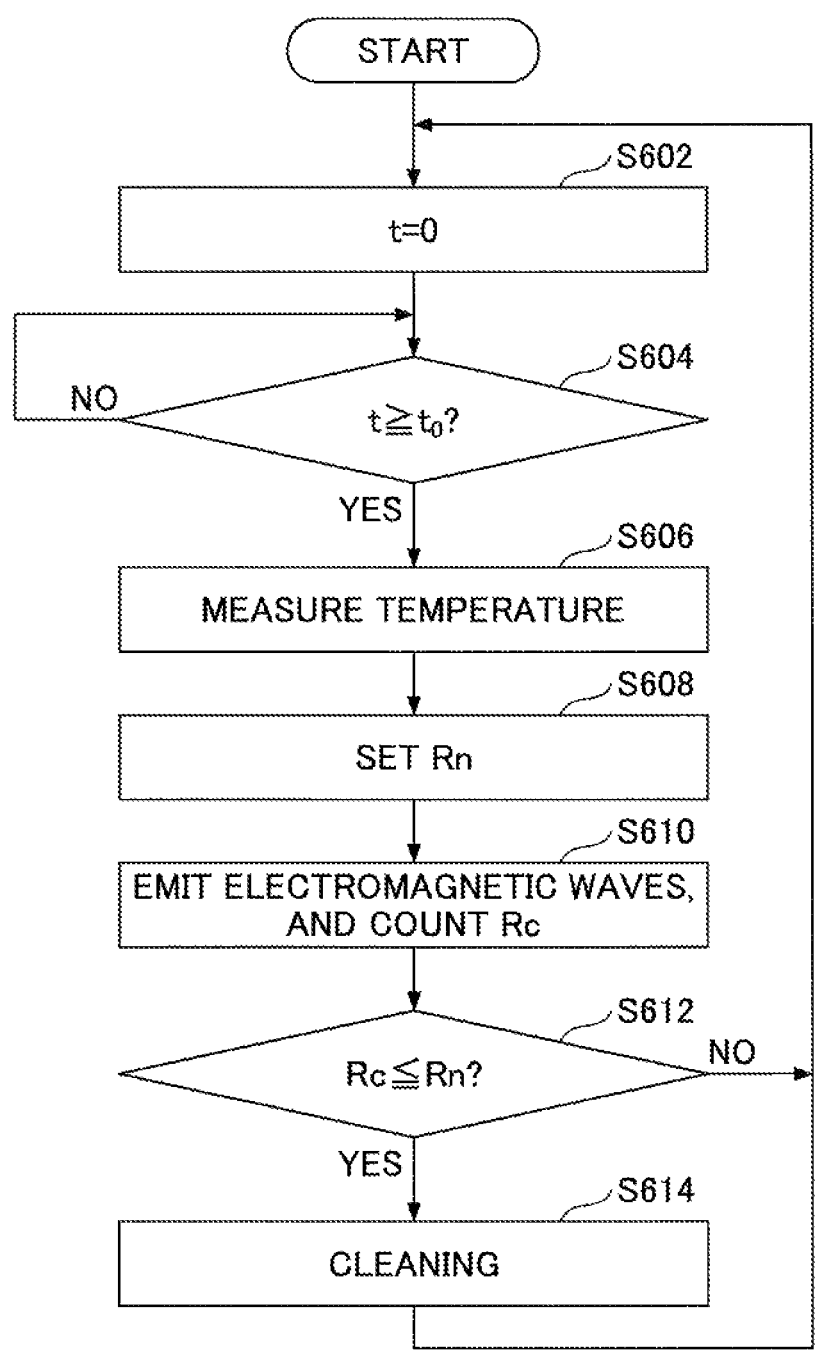
FIG. 15 is a flowchart of a method of detecting fine particles by a fine particle detector according to a sixth embodiment.

Next, a sixth embodiment will be described. According to a method of measuring fine particles according to the sixth embodiment, a value used for determining whether the accumulated amount of fine particles accumulated at the fine particle collection part 10 is greater than or equal to a predetermined amount is adjusted based on a temperature measured by a thermometer attached to the casing part 20. A method of detecting fine particles according to the sixth embodiment will be described with reference to FIG. 15. Note that control, calculation, and the like in the following processes are performed by the fine particle detection controlling part 51 except for heating by a microwave.

First, 0 is set to a timer t to start to measure time in step S602.

Next, it is determined in step S604 whether the time of the timer t has passed a predetermined time $t_0$. In a case where the time of the timer t has passed the predetermined time $t_0$ (YES in step S604), the processing goes to step S606.

In a case where the time of the timer t has not passed the predetermined time $t_0$ (NO in step S604), the process of step S604 is repeated.

Next, in step S606, a temperature in the casing part 20 is measured by the temperature measuring part 60.

Next, in step S608, a value of Rn is set based on the temperature measured in step S606. For the casing part 20 and fine particles such as PM, an amount of absorbing electromagnetic waves increases when the temperature rises. Therefore, the value of Rn is set to be lower in a case where the temperature measured in the temperature measuring part 60 is high, and the value of Rn is set to be higher in a case where the temperature measured in the temperature measuring part 60 is low.

Next, in step S610, electromagnetic waves of different frequencies are generated in the electromagnetic wave generating part 30 to emit the electromagnetic waves into the casing part 20. Then, powers of the reflection waves are measured to count the number Rc of frequencies of the waves whose intensities are less than or equal to the predetermined intensity.

Next, in step S612, it is determined whether the number Rc of frequencies of the waves, whose intensities are less than or equal to the predetermined intensity, is less than or equal to the predetermined number Rn. In a case where the number Rc of frequencies of the waves, whose intensities are less than or equal to the predetermined intensity, is less than or equal to the predetermined number Rn (YES in step S612), the processing goes to step S614 in order to perform cleaning of the fine particle collection part 10. On the other hand, in a case where the number Rc of frequencies of the waves, whose intensities are less than or equal to the predetermined intensity, is not less than or not equal to the predetermined number Rn (NO in step S612), the processing goes to step S602 because cleaning of the fine particle collection part 10 is not necessary.

Next, in step S614, cleaning is performed to remove the fine particles such as PM accumulated in the fine particle collection part 10.

Although the value of Rn is changed depending on the temperature in the described sixth embodiment, the predetermined intensity for the reflection waves may be changed in accordance with the temperature.

Note that in the sixth embodiment, pass-through electromagnetic waves may be used (measured) instead of the reflection waves. Further, other configurations and processes of the sixth embodiment are similar to those of the first embodiment.

The embodiments have been specifically described above, but the present disclosure is not limited to the specific embodiments and various modifications and variations may be made without departing from the scope of the present disclosure.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A fine particle detector comprising:
    a casing configured to accommodate an object to be heated;
    an electromagnetic wave generator configured to generate electromagnetic waves of different frequencies;
    at least one power sensor configured to measure powers, from the casing, of the electromagnetic waves that have entered into the casing; and
    a fine particle detection controller that is electrically coupled to the at least one power sensor, the fine particle detection controller configured to determine, based on the powers of the electromagnetic waves of the different frequencies measured by the at least one power sensor, whether an accumulated amount of fine particles accumulated in the object to be heated is greater than or equal to a predetermined accumulated amount,
    wherein the fine particle detection controller is configured to detect that the accumulated amount of the fine particles accumulated in the object to be heated is greater than or equal to the predetermined accumulated amount in response to detecting that a number of electromagnetic waves whose powers are less than or equal to a predetermined power detected by the at least one power sensor is less than or equal to a predetermined number.

2. The fine particle detector according to claim 1, wherein the at least one power sensor is a reflection power sensor configured to measure powers of electromagnetic waves reflected in the casing among the electromagnetic waves emitted to the casing from the electromagnetic wave generator.

3. The fine particle detector according to claim 1, wherein the at least one power sensor is a pass-through power sensor configured to measure powers of electromagnetic waves that have passed through the object to be heated among the electromagnetic waves emitted to the casing from the electromagnetic wave generator.

4. The fine particle detector according to claim 1,
    wherein the at least one power sensor includes a first power sensor and a second power sensor,
    wherein the first power sensor is a reflection power sensor configured to measure powers of electromagnetic waves reflected in the casing among the electromagnetic waves emitted to the casing from the electromagnetic wave generator, and
    wherein the second power sensor is a pass-through power sensor configured to measure powers of electromagnetic waves that have passed through the object to be heated among the electromagnetic waves emitted to the casing from the electromagnetic wave generator.

5. The fine particle detector according to claim 1,
    wherein the electromagnetic wave generator is configured to generate the electromagnetic waves of the different frequencies within a predetermined range.

6. A fine particle detector comprising:
    a casing configured to accommodate an object to be heated;
    an electromagnetic wave generator configured to generate electromagnetic waves of different frequencies;
    at least one power sensor configured to measure powers, from the casing, of the electromagnetic waves that have entered into the casing; and
    a fine particle detection controller that is electrically coupled to the at least one power sensor, the fine particle detection controller configured to determine, based on the powers of the electromagnetic waves of the different frequencies measured by the at least one power sensor, whether an accumulated amount of fine particles accumulated in the object to be heated is greater than or equal to a predetermined accumulated amount,
    wherein the electromagnetic wave generator is configured to generate the electromagnetic waves of the different frequencies within a predetermined range, and
    wherein the fine particle detection controller is configured to detect that the accumulated amount of the fine particles accumulated in the object to be heated is greater than or equal to the predetermined accumulated amount in response to detecting that electromagnetic waves whose powers are greater than or equal to a predetermined power detected by the at least one power sensor are absent.

7. A fine particle detector comprising:
a casing configured to accommodate an object to be heated;
an electromagnetic wave generator configured to generate electromagnetic waves of different frequencies;
at least one power sensor configured to measure powers, from the casing, of the electromagnetic waves that have entered into the casing; and
a fine particle detection controller that is electrically coupled to the at least one power sensor, the fine particle detection controller configured to determine, based on the powers of the electromagnetic waves of the different frequencies measured by the at least one power sensor, whether an accumulated amount of fine particles accumulated in the object to be heated is greater than or equal to a predetermined accumulated amount,
wherein the electromagnetic wave generator is configured to generate the electromagnetic waves of the different frequencies within a predetermined range, and
wherein the fine particle detection controller is configured to detect that the accumulated amount of the fine particles accumulated in the object to be heated is greater than or equal to the predetermined accumulated amount in response to detecting that an integral quantity obtained by frequency-integrating the powers detected by the at least one power sensor is less than or equal to a predetermined value.

8. A fine particle detector comprising:
a casing configured to accommodate an object to be heated;
an electromagnetic wave generator configured to generate electromagnetic waves of different frequencies;
at least one power sensor configured to measure powers, from the casing, of the electromagnetic waves that have entered into the casing; and
a fine particle detection controller that is electrically coupled to the at least one power sensor, the fine particle detection controller configured to determine, based on the powers of the electromagnetic waves of the different frequencies measured by the at least one power sensor, whether an accumulated amount of fine particles accumulated in the object to be heated is greater than or equal to a predetermined accumulated amount,
wherein the electromagnetic wave generator is configured to generate the electromagnetic waves of the different frequencies within a predetermined range, and
wherein the fine particle detection controller is configured to detect that the accumulated amount of the fine particles accumulated in the object to be heated is greater than or equal to the predetermined accumulated amount in response to detecting that an integral quantity obtained by frequency-integrating absolute values of frequency-differential values of the powers detected by the at least one power sensor is less than or equal to a predetermined value.

9. The fine particle detector according to claim 1, wherein a temperature measure configured to measure a temperature of the casing is provided at the casing.

10. The fine particle detector according to claim 1, wherein the frequencies of the electromagnetic waves generated in the electromagnetic wave generator are greater than or equal to a minimum resonant frequency in the casing.

11. An exhaust gas purification apparatus, comprising:
the fine particle detector according to claim 1; and
a fine particle collector configured to collect the fine particles included in exhaust gas,
wherein in a case where the accumulated amount of the fine particles accumulated in the fine particle collector has reached the predetermined accumulated amount, the fine particle collector is irradiated with a microwave generated in the electromagnetic wave generator.

12. The exhaust gas purification apparatus according to claim 11, wherein a frequency of the microwave is equal to one frequency from among the different frequencies of the electromagnetic waves.

13. The exhaust gas purification apparatus according to claim 11, wherein a frequency of the microwave is greater than or equal to 2.4 GHz and less than or equal to 2.5 GHz.

14. The exhaust gas purification apparatus according to claim 11, wherein a frequency of the microwave is a frequency of an electromagnetic wave whose power, measured by the at least one power sensor, is less than or equal to a predetermined power.

15. The exhaust gas purification apparatus according to claim 11, wherein the electromagnetic wave generator includes a semiconductor element formed of one or more nitride semiconductors.

* * * * *